Figure 1A:
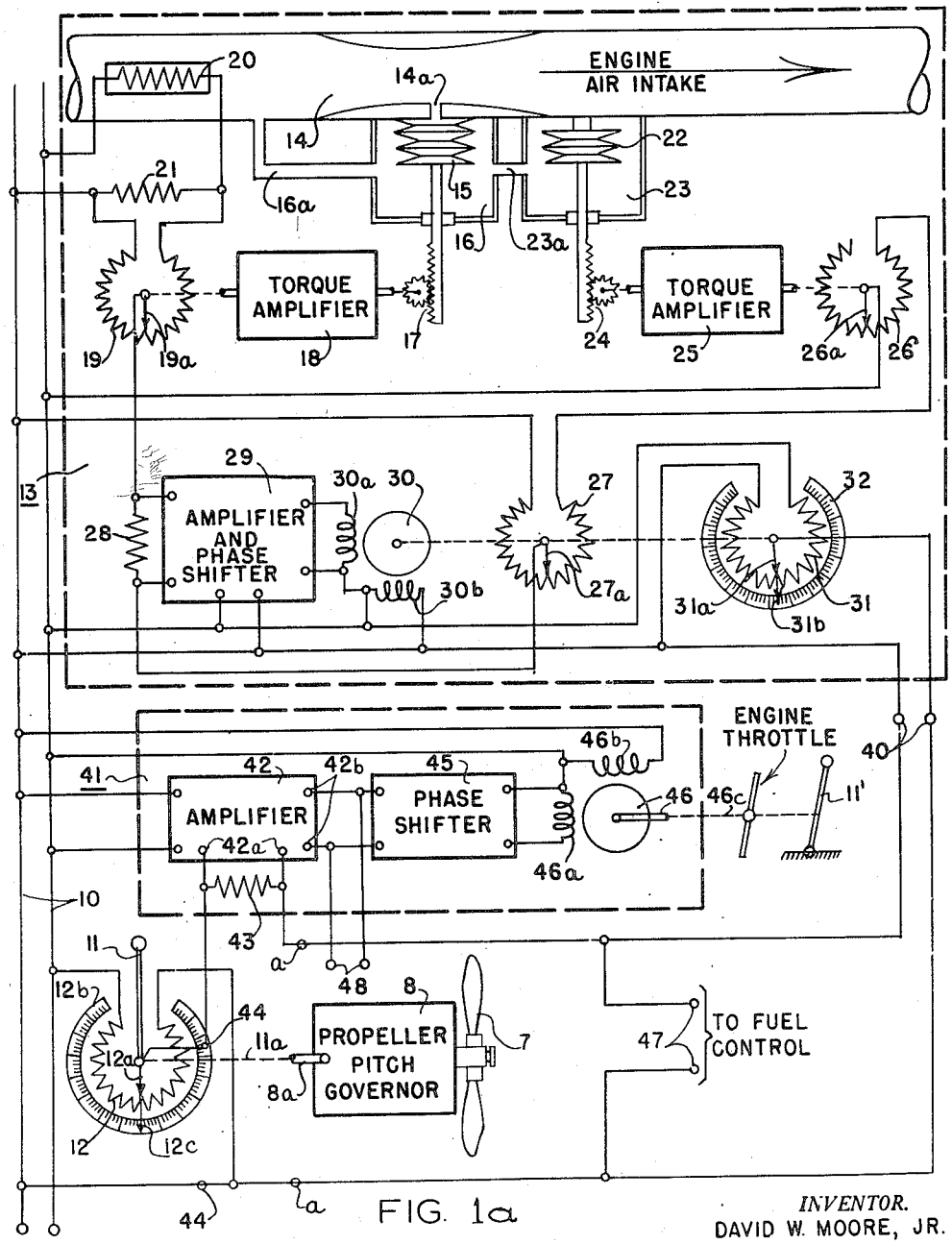

INVENTOR.
DAVID W. MOORE, JR.

INVENTOR.
DAVID W. MOORE, JR.
BY Mueller, Dodds & Mason
ATTORNEYS

Patented Sept. 5, 1950

2,521,244

UNITED STATES PATENT OFFICE 2,521,244

METHOD OF AND SYSTEM FOR CONTROLLING THE INPUT TO INTERNAL-COMBUSTION ENGINES

David W. Moore, Jr., New York, N. Y., assignor to Fairchild Camera and Instrument Corporation, a corporation of Delaware Application November 8, 1944, Serial No. 562,556

26 Claims. (Cl. 123—119)

This invention relates to a method of and system for measuring and controlling the air-mass input and the fuel-mass input to an internal combustion engine and varying the ratio between such inputs in accordance with varying power requirements and varying operating conditions. While the invention is of general application to all types of internal-combustion engines, it is particularly suitable to the establishment of an optimum fuel-air ratio in the input to an aircraft engine under all conditions of operation, thereby insuring maximum operating range, maximum power, or maximum economy, as required.

During the development of the internal combustion engine, the first devices for controlling the air mass and fuel mass inputs to the engine were carburetors comprising shallow trays filled with gasoline over which the air was drawn, picking up gasoline by vaporization to form a combustible mixture. While it was possible to run an engine with this form of carburetion, it was apparent that it was incapable of affording a definite and repeatable fuel-air ratio. In 1893 Maybach devised the float-type carburetor, the basic principle of which is still in rather general use today. With the Maybach carburetor it was possible to control the fuel-air ratio and to hold this ratio within rather broad limits for any given constant speed. With the demand for greater variations in speed and more economical operation, the Maybach carburetor in its basic form left much to be desired. It is a well-established fact that, for best performance of an internal combustion engine, the fuel-air ratio must be maintained at higher levels, that is, richer mixtures, in the idling range and in the maximum power range than in the cruising or normal operating range. Also, for most economical operation, there must be provided means for producing a lower fuel-air ratio than that corresponding to best power in the normal operating range.

In the basic carburetor of the Maybach type, the fuel flow was introduced through a restriction or nozzle placed at a point of reduced cross section in the air induction system. The resultant reduced pressure at such point in the air induction system produced a suction on the fuel nozzle which caused a fuel flow through the restriction varying roughly with the air-mass flow. By proper proportioning of the air and fuel restrictions, it was possible to obtain a given fuel-air ratio at a given air-mass flow under conditions of constant temperature and pressure of the air and constant specific gravity and viscosity of the fuel. To cover the range of air-mass flow required and to maintain the desired fuel-air ratio under varying operating conditions, various methods of modifying the basic relationship between fuel and air were introduced. These methods have been carried out by a wide variety of devices now well known to those versed in the art. Further, the float-type of carburetor imposes a definite limit on the attitudes of an aircraft into which it is maneuverable.

This basic method of carburetion, although modified by the various compensating devices mentioned above, remained unchanged until the advent of the so-called pressure or injection carburetor. This type of carburetor was developed to overcome some of the difficulties encountered with the previously described type. In the pressure-type carburetor, the fuel-sensing device and the air-sensing device are in independent sections of the carburetor and the fuel is injected under a positive pressure downstream from the air-sensing device. This type of carburetor eliminated, to a large extent, the icing and vapor-lock problems of the float-type carburetor and provided better atomization of the fuel, as well as permitting complete maneuverability of the plane. In the pressure-type carburetor, the air-mass flow is a function of the differential pressure, compensated for air density, produced across a Venturi system. This differential pressure is imposed across a diaphragm to the center of which is attached a link connected to a similar diaphragm in the fuel system. The fuel diaphragm is subjected to the differential pressure created by the flow of fuel through several metering orifices and opposes the differential pressure of the air diaphragm. Connected to the fuel diaphragm is a valve in the fuel inlet so arranged as to increase or decrease the flow of fuel, maintaining the differential pressure on the fuel diaphragm equal and opposite to the differential pressure imposed on the air diaphragm. Suitable variable-area orifices in the fuel system provide for gradually increasing the fuel-air ratio in the idling range as well as the maximum power range so that a desired fuel-air ratio schedule may be held.

While the pressure-type carburetor is a decided improvement over the previous types, the basic principle of a sensitive control has not been satisfied. The relatively small forces developed by the air-mass and fuel-mass sensing devices are used directly to perform the work of controlling the fuel-mass flow. Further, the differential pressures of these two devices are directly compared, resulting in interactions that impair the accuracy of the carburetion system as well as its stability, that is, its freedom from hunting. Also the direct utilization of such forces that are comparable in magnitude to the frictional resistances of the parts frequently introduces a substantial hysteretic lag into the operation of the system.

Furthermore, in both the float type and injection type of carburetors now in use, adjustments of the fuel-air ratio by the pilot, when changing between operation at the maximum power, as in takeoff, best cruising power, and economy mixture for cruising, are generally effected in discrete steps resulting in sudden changes in the "feel" of the plane, often causing apprehension and discomfort to passengers. On the other hand, it is desirable that the control of the engine should be smooth and continuous, whether automatic or manual.

The more precise of the carburetors described involve a number of adjustments to be made by the pilot. On the other hand, it is well known that it is desirable to minimize the many controls which must be operated by the pilot of an aircraft, particularly a military aircraft in which there must be a minimum of distraction of the pilot from the tactical operation of the craft. At the same time such an aircraft must necessarily operate over extremely wide ranges of operating conditions such as temperature, barometric pressure, speed, acceleration, rate of climb, etc., variations of any of which conditions substantially impair the operation of the aircraft if the fuel-air ratio is not compensated for such variations. Such an impairment of the operation of the engine may be manifested by a decrease in power and acceleration, a decrease in the rate of climb, increased fuel consumption with corresponding reduction in operating range, engine overheating, or a combination of a number of these factors. However, for the reasons stated above, it is impracticable for the pilot to make the readings and computations required to determine the necessary adjustments and then to make the adjustments to compensate for many of such variations in the operating conditions of the aircraft engine. The most satisfactory arrangement would, of course, involve a single control means to be set by the pilot in accordance with particular power requirements, with all subsidiary adjustments being automatically effected.

As previously stated, certain prior art arrangements have been directed toward automatically controlling the air mass and fuel mass inputs to an aircraft engine to obtain optimum operating conditions for various throttle or powerd requirements settings. In general, these systems have comprised mechanical devices for sensing a number of basic parameters, for example the velocity of air at the engine intake, its temperature and pressure, and utilizing the effects produced by these devices to control the fuel mass flow. Such systems are capable of approximately maintaining a desired fuel-air ratio only within certain rather wide limits. However, for satisfactory performance, internal combustion engines require an accurately predetermined variable fuel-air ratio over their entire ranges of operating conditions and it has been necessary, therefore, to add additional compensating devices to produce the desired results. Such compensating devices have decidedly increased the complexity of the systems and many of them are capable of effecting only approximate empirical compensations. In addition, there has generally been considerable interaction between the devices for sensing the basic parameters, or between one or more of such devices and one or more of the compensating devices, which may easily impair the accuracy and stability of the system.

From another viewpoint, such prior art systems have operated on the principle that the flow of fluid through an orifice or other constrictions is represented by the relationship $$W = k\sqrt{hp}$$

Where $W$ = fluid mass flow
$p$ = the density of the fluid
$h$ = the differential head across the orifice
$k$ = a constant and have controlled the fuel input valve by balancing or comparing the differential pressure across an orifice or constrictions in the air intake conduit against that across an orifice in the fuel intake conduit. In the case of fuel, such as gasoline, which is relatively inelastic, the density is constant and the relation is a simple one. In the case of air, however, the density changes with pressure and temperature so that the air-mass flow is not the same simple function of differential head as that for fuel; that is, the air-mass flow and fuel-mass flow follow substantially different characteristic curves. In the arrangements of the prior art described above, it has been attempted to match these divergent characteristics of the air-flow metering device and the fuel-flow metering device by cut-and-try methods, such as by altering the actual metering device for either the air or fuel, or both, as by the addition of compensating orifices in parallel or series with the main orifices. However, these compensating devices are all empirical and, because of the many inter-dependent factors involved, it has been impossible to compute them accurately, over the entire range of operating conditions, so as to obtain an accurately predetermined relationship between the characteristics of the two metering devices. Furthermore, under certain operating conditions, it is desired to vary the fuel-air ratio, that is, impart a predetermined mismatching of the characteristics of the air-metering and fuel-metering devices. In contrast to such systems, the present invention is directed to a system in which the characteristic of each metering device is accepted, whatever its nature so long as it is stable and reproducible, the comparison ratio or linkage between the differential pressure or velocity factor of the air-mass flow and that of the fuel-mass flow is varied, preferably electrically to compensate for the differences in their characteristic curves.

It is also customary to provide aircraft with variable pitch propellers by means of which the propeller speed is maintained substantially constant, for any given power setting, at the most efficient operating value. However it is desirable to effect adjustment of the propeller pitch automatically with variations in the setting of the throttle or horsepower requirements in order to adjust the governed speed in accordance with variations in power setting to maintain most efficient propeller operation consistent with best economy of fuel.

It is an object of the invention, therefore, to provide a new and improved method of and system for controlling the air-mass input and fuel-mass input to an internal combustion engine in accordance with varying power requirements while maintaining proper fuel and air inputs corresponding to an optimum fuel-air ratio, either for maximum operating economy or maximum power output, notwithstanding extremely wide variations in one or more of the operating conditions of the engine.

It is another object of the invention to provide a new and improved method of and system for controlling the air-mass input and the fuel-mass input to an internal combustion engine of the type described, by means of which one or more of the disadvantages and limitations of the arrangements of the prior art may be overcome.

It is another object of the invention to provide a new and improved method of and system for controlling the air-mass input and the fuel-mass input to an internal combustion engine having one or more of the following advantageous characteristics: completely or substantially completely automatic operation, involving a minimum of controls and adjustments required of the pilot; a high degree of sensitivity and accuracy in performance, avoiding hysteretic lag and interaction between the several sensing and control devices; adaptability to a wide range of various operating conditions; operation at maximum positive fuel pressure to avoid vapor-lock and other irregularities in performance; suitably for control of an aircraft engine including freedom from interference with the maneuverability of the aircraft, gradual and continuous control, involving a minimum of passenger discomfort, and automatic adjustment of the setting of the propeller-pitch governor.

In accordance with the invention, a system for controlling the input to an internal combustion engine in accordance with varying power requirements, the engine including an adjustable throttle, comprises control means for setting the power requirements of the engine together with means for determining the absolute air flow to the engine. The system also includes means for adjusting the throttle of the engine jointly in accordance with the setting of the control means and the air flow to the engine.

In a specific embodiment of the invention, a system for controlling the input to an internal combustion engine in accordance with varying power requirements, the engine including an air intake conduit having a throttle therein, comprises control means for setting the power requirements of the engine, means for developing a first electrical effect varying with the velocity of the air in the conduit, means for developing a second electrical effect varying with the temperature of the air in the conduit, means for developing a third electrical effect varying with the pressure of the air in the conduit, a voltage modulator including an adjustable element, an electrical bridge circuit including the modulator and including also provisions for introducing such electrical effects therein. The system also includes means responsive to an unbalance of the bridge circuit for adjusting the adjustable element of the voltage modulator to rebalance the bridge and means for adjusting the throttle of the engine jointly in accordance with the setting of the control means and the setting of the adjustable element.

Further in accordance with the invention, a system for controlling the fuel input to an internal combustion engine in accordance with varying power requirements, the engine including a fuel system having a fuel intake valve, comprises means independent of the fuel system for setting the desired fuel flow to the engine, means for measuring the actual fuel flow to the engine, and means for adjusting the fuel intake valve of the engine in accordance with the difference between the desired and the actual fuel flows.

Further in accordance with the invention, a system for controlling the air and fuel input to an internal combustion engine in accordance with varying power requirements while maintaining an optimum of fuel-air ratio, the engine including independently adjustable air and fuel intake valves, comprises control means for setting the power requirements of the engine, means for determining the absolute air flow to the engine and means for adjusting the air intake valve of the engine jointly in accordance with the setting of the control means and the air flow to the engine. The system also includes means for determining the fuel flow to the engine and means for adjusting the fuel intake valve of the engine jointly in accordance with the air flow to the engine and the fuel flow to the engine.

Further in accordance with the invention, a system for controlling the input to an internal combustion engine in accordance with varying power requirements while maintaining an optimum fuel-air ratio, said engine including an independently adjustable throttle and fuel intake valve, comprises means for adjusting the throttle in accordance with varying power requirements of the engine, means for determining the absolute air flow to the engine, means for determining the fuel flow to the engine, and means for adjusting the fuel intake valve of the engine jointly in accordance with the air flow to the engine and the fuel flow to the engine.

Further in accordance with the invention, a system for controlling the fuel-air ratio of the input to an internal combustion engine under variable operating conditions comprises means for developing a first effect varying in accordance with the air-mass flow to the engine, means for developing a second effect substantially non-reactive on the first-named means and varying in accordance with the fuel-mass flow to the engine, and means responsive jointly to such effects for modifying the fuel-air ratio of the input to the engine.

Further in accordance with the invention, the method of controlling the input to an internal combustion engine in accordance with varying power requirements, the engine including an adjustable throttle and control means, comprises setting the control means to the desired engine power, determining the absolute air flow to the engine, and adjusting the throttle of the engine jointly in accordance with the setting of the control means and the air flow to the engine.

Further in accordance with the invention, the method of controlling the fuel input to an internal combustion engine in accordance with varying power requirements, the engine including a fuel system having a fuel intake valve, comprises setting the desired fuel flow to the engine independently of the fuel system, measuring the actual fuel flow to the engine, and adjusting the fuel intake valve of the engine in accordance with the difference between the desired and actual fuel flows.

In accordance with a specific embodiment of the invention, the method of controlling the air and fuel input to an internal combusion engine in accordance with varying power requirements, while maintaining an optimum fuel-air ratio, the engine including independently adjustable air and fuel intake valves and control means, comprises setting the control means to the desired engine power, measuring the absolute air flow to the engine and adjusting the air intake valve jointly in accordance with the setting of the control means and the air flow to the engine. The method also includes measuring the fuel flow to the engine, deriving from the measured air flow an effect representative of the fuel requirements of the engine, and adjusting the fuel intake valve of the engine jointly in accordance with the fuel flow to the engine and the derived effect.

For a better understanding of the invention, together with other and further objects thereof, reference is had to the following description taken in connection with the accompanying drawings while its scope will be pointed out in the appended claims.

Figure 1B:
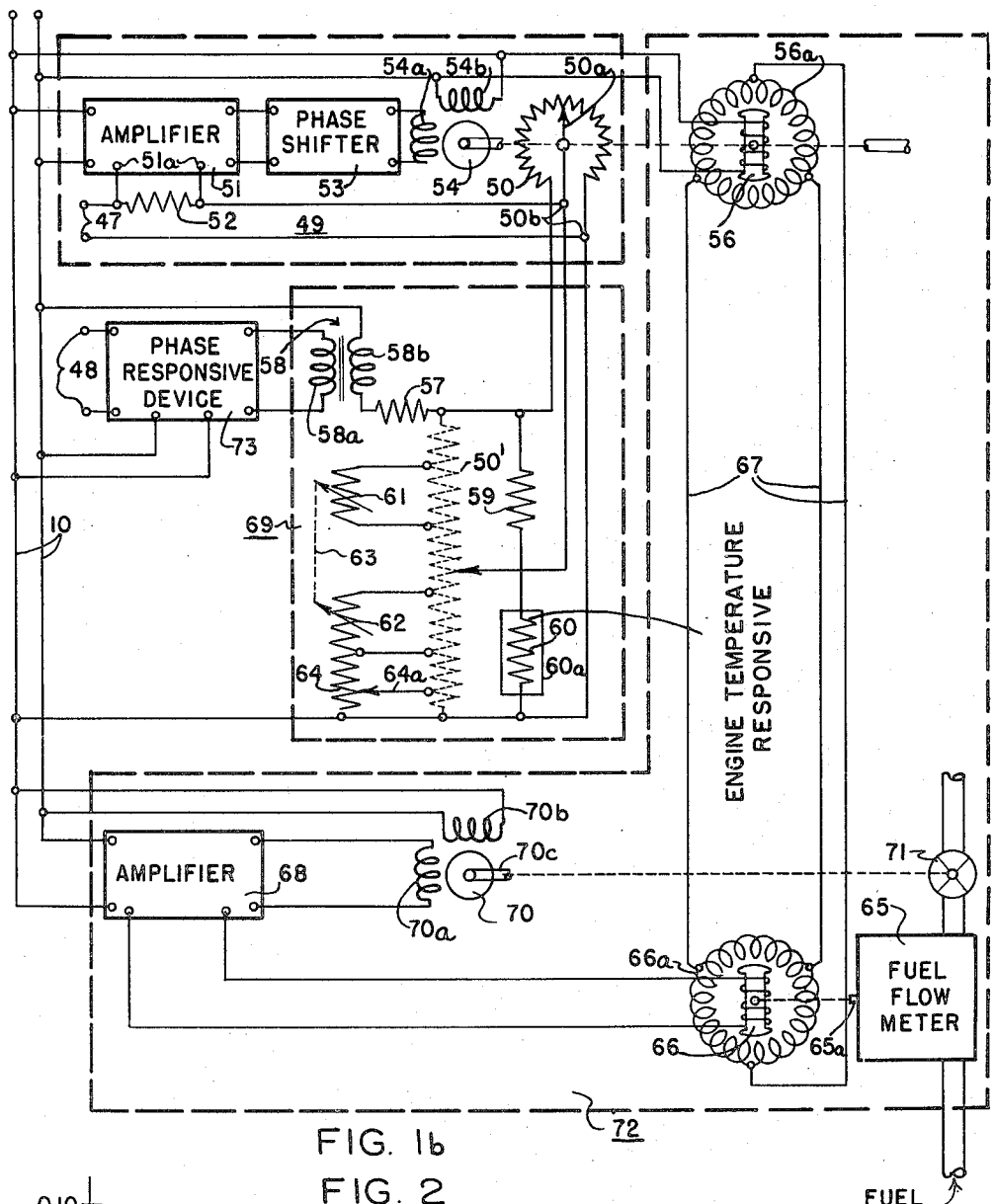
Figure 2:
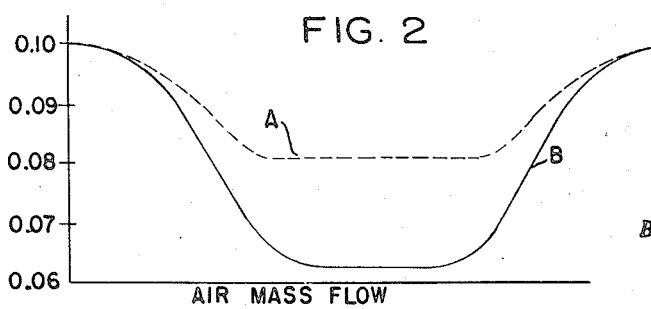

Referring now to the drawings, Figs. 1a and 1b together comprise a schematic representation of a complete system embodying the invention for controlling the input to an internal combustion engine in accordance with varying power requirements and by means of which the method of the invention can be carried out, while Fig. 2 is a graph of certain operating characteristics of the system of Fig. 1 to aid in the understanding of the invention.

Referring now more particularly to Figs. 1a and 1b of the drawings, these figures together represent a system for controlling the air and fuel input to an internal combustion engine in accordance with varying power requirements while maintaining an optimum fuel-air ratio, it being assumed that the engine includes an adjustable throttle or air intake valve and an independently adjustable fuel valve. Considering first the portion of the system directed to controlling the air input to the engine in accordance with varying power requirements represented in Fig. 1a, this portion of the system includes an alternating-current supply circuit or control circuit 10 and a control means or device, such as a control lever 11, for setting the power requirements of the engine. The system also includes means controlled by the device 11 for developing a first effect representative of the power requirements of the engine, for example, a voltage modulator such as a voltage divider 12 connected across the circuit 10 and provided with an adjustable contact element 12a actuated by the lever 11 for deriving from the circuit 10 a first electrical signal modulated in accordance with the setting of the control lever or device 11 and representing the power requirements of the engine. This first electrical signal is developed at the terminals 44, 44 connected to the adjustable contact 12a and one terminal of voltage divider 12. The voltage divider 12 is also provided with a pointer 12c cooperating with the scale 12b to indicate approximately the horsepower which the engine is set to develop. In case the engine is connected to drive a variable-pitch propeller 7, preferably, the control lever 11 is also provided with a mechanism, indicated schematically at 11a, for adjusting a control lever 8a of a pitch-controlling governor 8 for controlling the pitch of the propeller 7 to maintain the propeller speed substantially constant for any given power setting. The propeller pitch governor 8 may be of any of several well-known types, for example of the type illustrated and described at pages 440–442, inclusive, of "Aircraft Power Plants" by Arthur P. Fraas, McGraw-Hill, 1943.

The system also includes means for measuring or determining the absolute air-mass flow in the air intake conduit of the engine. This means is represented by the air mass flow unit 13 constituting means for developing an effect, specifically an electrical signal, varying in accordance with the air-mass flow to the engine. The unit 13 comprises means for developing an electrical effect or signal varying with the velocity of the air in the air intake conduit. Specifically, the unit 13 includes a Venturi constriction 14 in the engine air intake conduit and means for developing an electrical effect or signal varying with the square-root of the differential pressure across the Venturi constriction. This latter means may comprise a bellows type diaphragm 15 subjected on one side to the pressure at the throat of the venturi 14 through a passage 14a and enclosed in a casing 16 open to the pressure at the intake side of the venturi 14 through a conduit 16a. The diaphragm 15 is connected through a suitable operating mechanism, such as a rack and pinion 17 and a torque amplifier 18, to an adjustable contact 19a of a voltage divider or modulator 19.

The unit 13 also includes means for developing an electrical effect varying with the temperature of the fluid in the conduit; specifically, a resistor 20 located in the engine air intake conduit and having a high temperature coefficient of resistance. The resistor 20 is connected in series with a resistor 21 across the supply circuit 10 while the voltage divider 19 is connected across the resistor 21. The voltage divider resistor 19 is tapered, that is, it has a non-linear displacement-resistance characteristic which follows approximately a square-root relationship so that the portion of the resistance included in the circuit by the contact element 19a follows approximately the square-root of the differential pressure across the Venturi constriction 14 and thus approximately the velocity of the air in the engine air intake conduit.

The unit 13 also includes means for developing an electrical effect varying with the pressure of the air in the engine air intake conduit, specifically a hermetically sealed pressure capsule 22 of the bellows diaphragm type disposed in a casing 23 connected to the high pressure side of the Venturi constriction 14 through the conduit 16a and a conduit 23a. The capsule 22, through suitable operating mechanism such as a rack and pinion 24 and a torque amplifier 25, actuates an adjustable contact element 26a of a voltage divider or modulator 26.

The unit 13 also includes a voltage divider or modulator 27 provided with an adjustable contact element 27a and connected across the supply circuit 10 through an adjustable portion of the resistor 26. The resistor 26 is also tapered, that is, it has a non-linear displacement-resistance characteristic so that it is effective to connect in circuit with voltage divider 27 a resistance value varying with the square-root of the ratio of the pressure to which the capsule 22 is subjected to the standard pressure at which it is sealed.

The unit 13 comprises an electrical bridge circuit including as one branch thereof the resistors 20 and 21 with the voltage divider 19 in parallel with the latter and as the other arm, adjustable resistor 26 in series with the voltage divider 27, these connections comprising provisions for introducing into the bridge circuit the electrical effects developed as described above and variable in accordance with the temperature and pressure of the air in the engine air intake conduit. Specifically, the electrical effect or signal developed by the voltage divider 19 in response to the differential pressure across the Venturi constriction 14 is modified by the electrical effect developed by the resistor 20 and representative of the temperature of the air in such conduit, while the adjustable resistor 26 responsive to the pressure of the air in the engine air intake conduit is effective to modify the excitation of the voltage modulator 27 from supply circuit 10 and thus to modulate its output signal.

The unit 13 also includes means responsive to an unbalance of the bridge circuit described, that is, to the difference between the electrical signals developed by the voltage modulators 19 and 27, for adjusting the contact element 27a of the modulator 27 to balance the bridge circuit and to balance the two signals as described. This means comprises a resistor 28 interconnecting the adjustable contacts 19a and 27a and connected in the input circuit of an amplifier and phase shifter 29 energized from the supply circuit 10. The output circuit of the unit 29 is applied to a phase winding 30a of a phase responsive device, such as a two-phase motor 30, the other phase winding 30b of which is connected to the supply circuit 10. With such an arrangement, the position or setting of the adjustable contact element 27a is representative of the air-mass flow in the engine air intake conduit, as described hereinafter; however, the electrical signal appearing at the contact element 27a is not so representative, since it is modified by the action of the adjustable resistor 26. In order to derive an electrical signal representative of the air-mass flow to the engine, there is provided a linear voltage divider or modulator 31 connected across the supply circuit 10 and provided with an adjustable contact element 31a actuated by the motor 30 synchronously with the adjustable contact 27a. The contact 31a may be provided with an extended pointer 31b cooperating with a scale 32 for giving a visual indication of the air-mass flow to the engine. The electrical signal output of the unit 13 is derived from the adjustable contact element 31a and from one terminal of the voltage divider 31 and is applied to the output terminals 40.

The system also includes means for adjusting the throttle of air intake valve of the engine to control the air-mass flow to the engine jointly in accordance with the setting of the control device 11 and the air flow to the engine, as measured by the unit 13, that is, jointly in response to the electrical signal representative of the power requirements of the engine and that representative of the air-mass flow to the engine. This means comprises a throttle-adjusting unit 41 including a first differential means for comparing the setting of the control device 11 with the effect representative of the air flow to the engine developed at the terminals 40, 40; that is, responsive to the difference in the electrical signal derived by the control device 11 and the electrical signal developed at output terminals 40, 40 of the air-mass flow unit 13. The differential comparing means may be responsive to phase, amplitude, or other electrical characteristic of the two electrical signals, but, as illustrated, the throttle-adjusting unit 41 is responsive to the difference in amplitude of the two signals and comprises an amplifier 42 energized from the supply circuit 10 and including input terminals 42a across which is connected a comparing resistor 43 included in a comparing circuit constituting on the one hand the terminals 44, 44 at which appears the electrical signal representative of the setting of the control device 11 and on the other hand the terminals 40, 40 at which appears the electrical signal representative of the air-mass flow to the engine. The output terminals 42b of amplifier 42 are connected through a phase shifter 45 to a phase winding 46a of a polyphase electromotive device, such as a two-phase motor 46, the other phase winding 46b of which is connected to the supply circuit 10. The motor 46 is mechanically connected by a shaft 46c to the engine throttle to adjust the same, as indicated. The shaft 46c may also extend to an auxiliary control lever 11' by means of which the throttle may be adjusted manually either with or without omission of control lever 11 and throttle-adjusting unit 41.

To the terminals 40, 40 are connected the control terminals 47 for extension to the fuel control system of Fig 1b for supplying thereto an electrical signal representative of the actual air flow to the engine. Also to output terminals 42b of amplifier 42 are connected control terminals 48 for connection to the fuel control system of Fig. 1b for supplying thereto an electrical signal representative of the acceleration or rate of change of power requirements of the engine, that is, the first derivative of the signal appearing at the terminals 44, 44.

In Fig. 1b there is represented the portion of the system for controlling the fuel input to the engine in accordance with varying power requirements. This portion of the system includes an air-fuel flow-comparing unit 49 for setting the desired fuel flow to the engine and comprising means for determining the air-mass flow to the engine, as described above, and means responsive to such air-mass flow and independent of the fuel system for deriving an effect, such as an electrical signal, representative of the desired fuel-mass flow to the engine. This air-fuel flow-comparing unit 49 includes a voltage modulator or divider 50 having an adjustable contact element 50a and connected to the supply circuit 10 for deriving therefrom a third electrical signal representative of the fuel flow, together with means responsive jointly to the second and third electrical signals for adjusting the contact 50a to adjust the third signal to equalize the second and third signals and for simultaneously setting the primary element of a follow-up system, which may constitute a fuel requirements element. This means consists of an amplifier 51 energized from the supply circuit 10 and having input circuit terminals 51a across which is connected a differential or comparing resistor 52 for comparing the second signal appearing at the terminals 47 and the third signal appearing at terminals 50b, 50b individually connected to the adjustable contact 50a and one terminal of the voltage divider 50. Likewise this differential comparing circuit may be responsive to phase or other electrical characteristic of the two signals rather than to the amplitudes of these two signals. This differential signal, as amplified, is applied to a phase shifter 53 the output circuit of which is connected to one phase winding 54a of a motor 54 having a second phase winding 54b excited directly from the supply circuit 10. The motor 54 is connected to adjust the contact 50a through a shaft 55 which is also connected to the primary rotatable element 56 of a normally-balanced power follow-up circuit presently to be described.

The system also includes a fuel-modifying attenuator unit 69 for modifying the effect or electrical signal representative of the fuel requirements to the engine inversely in accordance with the temperature of the engine, to limit the heating thereof, together with manual means for modifying the effect or signal over one or more predetermined portions of its range to vary the fuel-air ratio of the engine input over such portion or portions of the range. This unit 69 comprises a voltage-divider circuit including the voltage divider 50, a voltage dropping resistor 57 and the secondary winding 58b of a transformer 58 the primary winding 58a of which is connected through a phase-responsive device 73 to the terminals 48 representing the acceleration control circuit from the system of Fig. 1a. This voltage divider circuit 50, 57 and 58a is connected across the supply circuit 10, the resistance of the voltage divider 50 being duplicated at 50' in dotted lines for the purpose of circuit simplification. Across the portion 50' of the voltage divider circuit is connected a circuit including a fixed resistor 59 and a temperature-variable resistor 60 responsive to the engine temperature, as by being enclosed in a casing 60a subject to the engine temperature. Across portions of the resistor 50' on opposite sides of its electrical midpoint are connected adjustable resistors 61, 62, interconnected for manual uni-control by mechanism indicated by dotted lines at 63. Across the portion of the resistor 50' representing low fuel input to the engine, which is effective during idling of the engine, is connected a resistor 64 having an adjustable contact 64a connected to a point on the resistor 50' near the zero fuel-flow setting. As described hereinafter, the adjustable resistors 61, 62 are effective to adjust the fuel-air ratio over predetermined portions of the fuel requirements range and to modify the electrical signal output of the voltage divider circuit over corresponding portions of its range, while the adjustable attenuator 64 is effective to adjust the idling fuel setting of the engine. The third electrical signal representative of the fuel requirements of the engine, modified as described, thus appears at the terminals 50b, 50b of air-fuel flow-comparing unit 49 from which it is compared with the air-flow signal appearing at the terminals 47, as described above.

The fuel-flow system also includes a fuel-flow measuring and setting unit 72 including the normally-balanced follow-up system referred to. This unit 72 includes means for measuring, or deriving an effect representative of, the actual fuel flow to the engine, for example a fuel flowmeter 65 connected in the fuel input conduit of the engine and having an output shaft 65a connected to actuate the rotatable secondary element 66 of the normally-balanced power follow-up system including the primary element 56 actuated by the fuel requirements setting means including the motor 54. The power follow-up system may be of any of the several types known in the art responsive to differences in amplitude or other electrical characteristic of the signals derived by the primary and secondary elements, but is illustrated, by way of example, as of the well-known self-synchronizing, phase-responsive type. Each of the primary and secondary elements 56 and 66 is a rotatable salient-pole wound rotor and these rotors are individually disposed within the polyphase armature windings 56a and 66a, respectively, similar points of the windings being interconnected by means of the polyphase circuit 67. The winding of the primary element 56 is excited from the supply circuit 10, while the winding of the secondary element 66 is connected to an amplifier 68 energized from the supply circuit 10. The output circuit of the amplifier 68 is connected to excite a winding 70a of a phase-responsive motor 70 having second phase winding 70b connected to the circuit 10. The motor 70 is connected by a shaft 70c to actuate a fuel intake valve 71 in the fuel supply line to the engine, as indicated. This power follow-up system including the elements 56, 66 and the phase-responsive motor 70 comprises means responsive to the difference between the desired and actual fuel flows for adjusting the fuel intake valve of the engine in accordance with such difference. Specifically, the phase-responsive motor 70 is responsive to the difference in the positions of the primary element 56, that is to the fuel-requirements setting motor 54, and the secondary element 66, responsive to the actual fuel flow, for adjusting the fuel intake valve and rebalancing the follow-up system. Further, as explained hereinafter, the transformer 58 comprises means responsive to the rate of change of the setting of the control device 11 for modifying the action of the fuel-measuring and setting unit 72 in accordance therewith. Thus the air-fuel comparing unit 49 and the fuel measuring and setting unit 72 comprise means responsive jointly to the electrical signal representative of the air-mass flow and the fuel-mass flow for controlling the fuel-mass flow for modifying the fuel-air ratio of the input to the engine and maintain it at an optimum value under various operating conditions.

By utilizing the unidirectionally acting relay or amplifier 42 for comparing the electrical signal developed by the voltage modulator 12 and representative of the power requirements of the engine with the electrical signal output of the unit 13, representative of the air mass flow to the engine, and by making the value of resistor 43 high relative to that of voltage dividers 12 and 31, the units 13 and 41 are substantially isolated so that the electrical signal output of unit 13 is non-reactive upon the power requirements setting device 11 and its associated voltage modulator 12 so that these two units are completely independent of the air-mass flow unit 13. Similarly, by utilizing the unidirectionally acting relay or amplifier 51 for comparing the electrical effect or signal output of the unit 13, representative of the air-mass flow to the engine, with the electrical signal output of the voltage modulator 50, representing the fuel requirements of the engine and by making the value of resistor 52 high relative to that of voltage dividers 31 and 50, the units 13 and 49 are substantially isolated so that the electrical signal output of the modulator 50 appearing at the terminals 50b is non-reactive upon the air-mass flow measuring unit 13 and the actions of these two units are completely independent. Still further isolation can be obtained by including buffer amplifiers at both sides of the comparing resistors 43 and 52.

The system described above makes possible the controlling of the air and fuel inputs to an internal combustion engine in accordance with varying power requirements, in spite of wide variations of various operating conditions, while maintaining an optimum fuel-air ratio, this control being effected by a control means such as the throttle control device 11. At the same time, as the horsepower requirements of the engine are varied by the control device 11, the control lever 8a of the propeller pitch governor 8 is adjusted by mechanism 11a to adjust the pitch of the propeller 7 to the optimum value corresponding to the new horsepower setting, while maintaining the propeller speed substantially constant at the value corresponding to best operation of the engine.

In explaining the operation of the above described fuel-air ratio control system, and referring first to the air-control system of Fig. 1a, it will be assumed that, initially, the system is in equilibrium, with the engine throttle adjusted to the setting corresponding to the particular power requirements of the engine. If now the control device 11 is adjusted clockwise, as referred to in Fig. 1a, that is, is set to increase the power output of the engine to a new desired value, it is effective to derive at the terminals 44, 44 an increased first electrical signal representative of the desired engine power. Therefore, a differential signal appears across the resistor 43 of throttle-adjusting unit 41 which is amplified in the amplifier 42 and applied through the phase shifter 45 to the winding 46a of motor 46. The phase shift in the circuit including the amplifier 42 and 45 is adjusted so that the output thereof excites the winding 46a substantially in quadrature with the excitation of the winding 46b. Therefore the motor 46 operates to adjust the engine throttle to the new power requirements setting at the same time increasing the air-mass flow to the engine. The air-mass flow measuring and setting unit 13 thereupon adjusts the voltage divider 31 to restore the balance of the system.

At the same time, if, for any given setting of control device 11, the air flow to the engine in weight per unit of time varies due to a variation in the speed of the engine, variation in the altitude of flight, and therefore in the density of the air, or for any other cause, the air-flow measuring unit 13 develops at terminals 40, 40 a second electrical signal of different value for comparison with the first electrical signal developed at terminals 44, 44 by the power requirements setting device 11.

Specifically, the operation of the air mass flow unit 13 may be understood by reference to the fundamental expression representing the mass flow of an elastic fluid, such as air, through an orifice or other constriction which is as follows:

$$W = k\sqrt{h} \cdot \sqrt{\frac{P_1}{P}} \cdot \sqrt{\frac{T}{T_1}}$$

or $$\sqrt{h} \cdot \sqrt{T/T_1} = KW \cdot 1/\sqrt{P_1/P}$$

Where $W$ = air-mass flow
$h$ = differential pressure across the constriction
$P_1$ = air pressure in the conduit
$P$ = air pressure in the conduit under standard conditions
$T_1$ = temperature of the air in the conduit
$T$ = temperature of the air intake under standard conditions By a proper choice of circuit constants, the variation of the resistance of the resistor 20 with temperature causes the electrical signal developed across the resistor 21 to be represented, over the range of operation, very closely by the relation:

$$e_2 = ke_1 \cdot \sqrt{T/T_1}$$

Where $e_2$ = the signal across resistor 21
$e_1$ = the signal at the supply circuit 10

The voltage divider 19 is so tapered that the electrical signal appearing at the adjustable contact 19a is represented by the relation:

$$e_3 = ke_2\sqrt{h} = ke_1\sqrt{h} \cdot \sqrt{T/T_1}$$

Where $e_3$ = the signal at the adjustable contact 19a

Again, the adjustable resistor 26 is so tapered that the electrical signal appearing across the voltage divider 27 is represented by the relation $$e_5 = ke_1 \cdot 1/\sqrt{P_1/P}$$

Where $e_5$ = the electrical signal across the voltage divider 27

The electrical signal $e_4$ appearing at the adjustable contact 27a of the voltage divider 27 is therefore an adjustable portion of the signal $e_5$. This signal $e_4$ is balanced against the signal $e_3$ appearing at the adjustable contact 19a to satisfy equation $$\sqrt{h} \cdot \sqrt{T/T_1} = kW \cdot 1/\sqrt{P_1/P}$$

above. When the signal $e_3$ is equal to the signal $e_4$ and the system is in balance, the position of the adjustable contact 27a is representative of the absolute air mass flow to the engine. Obviously, the position of the adjustable contact 31a driven synchronously therewith and the value of the signal appearing at the adjustable contact 31a of the linear voltage divider 31 are also representative of the absolute air-mass flow to the engine. This quantity is indicated by the pointer 31b cooperating with the scale 31.

Thus the apparatus described is thus effective to determine the absolute air flow to the engine and to develop a second electrical signal appearing at the terminals 40, 40 which is representative of such air flow. Any variation in this signal due to any of the causes described will result in a differential signal appearing across resistor 43 which, by means of the amplifier 42, phase shifter 45 and motor 46, is effective to adjust the throttle of the engine in accordance with the difference of the first and second signals.

Coming now to the fuel-flow control system of Fig. 1b, again it will be assumed that initially the system is in equilibrium and that the fuel flow to the engine is in proper relation to the air flow, determined as described above for optimum fuel-air ratio. If now the electrical signal representative of the air flow appearing at terminals 47 varies, due to any of the factors described, the difference between this signal and the signal derived from the terminals 50b of air-fuel flow comparing unit 49 is applied to amplifier 51 and, through phase shifter 53, to the winding 54a of motor 54. The amplifier 51 and phase shifter 53 are designed to impart a quadrature phase shift to the excitation of the winding 54a relative to that of winding 54b so that a torque is developed by the motor 54 which is effective to adjust the contact 50a to a proper setting to equalize these two signals and restore the balance of the air-fuel flow-comparing unit. The adjustment of the contact 58a represents the new desired fuel flow to the engine.

The fuel flow meter 65 continuously measures the actual fuel flow to the engine and sets the secondary element 66 of the power follow-up system to a position corresponding to such actual fuel flow so that the phase and amplitude of the voltage induced in the secondary element 66 constitutes a third electrical signal the phase and amplitude of which is representative of the actual fuel flow to the engine. The operation of the motor 54 as described above is effective simultaneously to adjust the primary element 56 of the follow-up system to unbalance this system; that is, so that the primary and secondary ele-means 56 and 66 do not occupy corresponding positions. As a result, the voltage induced in the secondary element 66 and applied to winding 70a of two-phase motor 70 is shifted in phase with respect to that of the supply circuit 10 from which the second winding 70b is excited directly. As a result, the signal induced in the secondary element 66 is effective to cause a rotation of the motor 70 to adjust the fuel-intake valve 71 of the engine in accordance with the difference between the desired and actual fuel flows; that is, the phase of the signal applied to the follow-up primary element 56 is compared with the phase of the signal induced in the secondary element 66 to adjust the fuel-intake valve 71 in accordance with such difference. Adjustment of the fuel-intake valve 71 is effective to adjust the fuel flow to the engine to such a value that the flow meter 65 adjusts the secondary element 66 of the follow-up system to a position corresponding to the primary element 56, thereby restoring the desired fuel-air ratio of the engine and the balance of the follow-up system.

In the tactical operation of an aircraft including the air and fuel control system described, it is often advantageous to depart from the optimum fuel-air ratio, either to increase the richness of the mixture for maximum power requirements or to decrease the richness of the mixture for maximum economy, as during cruising. These characteristics can be obtained by means of the fuel-modifying attenuator unit 69 including adjustable attenuators 61, 62 connected across portions of the voltage-divider resistor 50' and connected by the mechanism 63 for uni-control. If the resistors 61 and 62 are adjusted substantially to their minimum values, the effect is to alter the shape of the fuel-air ratio characteristic of the system to substantially that represented by Curve A of Fig. 2, representing the adjustment for automatic maximum richness of mixture. On the other hand, if the resistors 61 and 62 are adjusted to substantially their maximum values, the shape of the characteristic is altered to that represented by Curve B of Fig. 2, corresponding to the automatic maximum leanness of mixture. Various intermediate mixture adjustments can be selected by the pilot in accordance with particular operating conditions. The adjustable contact 64a on attenuator 64 is effective to adjust the idling mixture, adjustment to the minimum or zero-potential point of the network resulting in maximum richness of mixture.

In case of prolonged operation of the system with an abnormally rich mixture, that is an abnormally high fuel-air ratio, the engine may tend to overheat considerably. The temperature-responsive resistor 60 under such conditions will increase in its resistance value, thereby effectively increasing the value of the signal at the terminals 50b and automatically reducing the fuel-air ratio.

Further, upon a rapid adjustment of the control device or lever 11 to obtain rapid acceleration of the engine, it is desirable momentarily to enrich the mixture during the short period of time required for the control system to follow the movement of the control lever 11. This acceleration control may be effected in accordance with the signal output appearing at the terminals 42b of amplifier 42 due to the fact that the system will not follow instantaneously rapid adjustments of the control lever 11. This control signal is applied by way of terminals 48 and the phase-responsive device 73 to the primary winding 58a of transformer 58 which induces in the secondary winding 58b a potential which is effective to modify the signal at the terminals 50b momentarily to increase the fuel-air ratio. The phase-responsive device 73 may be of any suitable type which is effective to respond to an alternating potential only of a given polarity and to suppress an alternating potential of the opposite phase or polarity, such as would be developed by a sudden deceleration of the aircraft. However, this feature of enriching the fuel-air ratio during acceleration, per se, forms no part of the present invention but is described and claimed in the copending application of Sherman M. Fairchild, entitled "Fuel-Air Ratio Control System," Serial No. 562,560, filed concurrently herewith and assigned to the same assignee as the present application and now Patent No. 2,482,254, issued September 20, 1949.

While the operation of the fuel-flow control system has been described with reference to an increase in the signal at the terminals 47 due to an increase in the air flow to the engine, it will be clear that the operation is similar in case of a variation of the signal at the terminals 50b, representative of the fuel requirements of the engine, which may vary in response to any of the variable conditions described as well as to any variations in the characteristics of the fuel supply system including the fuel pump, variations in fuel temperature, viscosity, and the like.

It will be apparent that the air and fuel control system described above is suitable for application to the automatic mixture control of an engine with either continuous carburetion or a timed fuel-injection system.

It is also apparent that, in a complete system for controlling the air-mass input and the fuel-mass input to an engine, there may be substituted for the particular units described other units procuring similar over-all results; for example, for the air-mass-flow unit 13 there may be substituted any of several types of air-mass-flow devices such as that described and claimed in my copending application, entitled "Elastic Fluid-Flow Measuring System," Serial No. 562,557, filed concurrently herewith and assigned to the same assignee as the present application and now Patent No. 2,472,609, issued June 7, 1949. Similarly, for the air-fuel-flow comparing unit 49 and the fuel-flow measuring and setting unit 72, there may be substituted the fuel-flow determining system described and claimed in my copending application, entitled "Fluid Flow Determining System," Serial No. 562,558, filed concurrently herewith and assigned to the same assignee as the present application and now abandoned.

Furthermore, in certain applications of the invention it may be possible and desirable to simplify the system described by the omission of certain features, though at the sacrifice of their respective contributions to the system as a whole. For example, the throttle adjusting unit 49 may be omitted, the circuit being broken at the points $a, a$, and the air-mass-flow controlled manually by adjustment of the engine throttle by a manually controlled lever 11' connected thereto. In such a case, the air-mass-flow is set empirically by the pilot to secure the desired operation of the aircraft; however, variations in altitude will result in substantial changes of air-mass-flow and power output for any given setting of the throttle lever 11' and a readjustment of the throttle will be required to maintain the desired power output of the aircraft engine. Also in certain installations, it may be feasible to omit the fuel-modifying attenuator unit 69, in which case the system is effective to maintain a constant fuel-air ratio under all operating conditions.

While there has been described what is at present considered to be the preferred embodiment of the invention, it will be apparent to those skilled in the art that various changes and modifications may be made therein without departing from the spirit or scope of the invention.

What is claimed as new is:

1. A system for controlling the air and fuel input to an internal combustion engine in response to varying power requirements while maintaining an optimum fuel-air ratio, said engine including independently adjustable air and fuel intake valves, comprising, control means for setting the power requirements of the engine, means for determining the absolute air flow to the engine, means for adjusting the air intake valve of the engine jointly in accordance with the setting of said control means and the air flow to the engine, means for measuring the fuel flow to the engine, means for developing a first electrical signal representative of the air flow to the engine, a voltage modulator having an output circuit including an adjustable element for developing a second electrical signal, means responsive jointly to said signals for adjusting said element to equalize said signals, a fuel requirements element connected to be set by said last-named means, and means for adjusting the fuel intake valve of the engine jointly in accordance with the fuel flow to the engine and the setting of said fuel requirements element.

2. A system for controlling the air and fuel input to an internal combustion engine in response to varying power requirements while maintaining an optimum fuel-air ratio, said engine including independently adjustable air and fuel intake valves, comprising, control means for setting the power requirements of the engine, means for determining the absolute air flow to the engine, means for adjusting the air intake valve of the engine jointly in accordance with the setting of said control means and the air flow to the engine, means for measuring the fuel flow to the engine, means for developing a first electrical signal representative of the air flow to the engine, a voltage modulator having an output circuit including an adjustable element for developing a second electrical signal, means responsive jointly to said signals for adjusting said element to equalize said signals, a normally-balanced power follow-up system including a primary element actuated by said last-named means and a secondary element actuated by said fuel-measuring means, and means responsive to the difference in positions of said primary and secondary elements for adjusting the fuel intake valve of the engine, thereby rebalancing said follow-up system.

3. A system for controlling the air and fuel input to an internal-combustion engine in accordance with varying power requirements while maintaining an optimum fuel-air ratio, said engine including independently adjustable air and fuel intake valves comprising, control means for setting the power requirements of the engine, means for deriving a first effect representative of the absolute air flow to the engine, a first differential means for comparing said first effect with the setting of said control means, means responsive to said differential means for adjusting the air intake valve of the engine, means for deriving a second effect representative of the fuel flow to the engine, a second differential means for comparing said first and second effects, and means responsive to said second differential means for adjusting the fuel intake valve of the engine.

4. A system for controlling the air and fuel input to an internal-combustion engine in response to varying power requirements while maintaining an optimum fuel-air ratio, said engine including independently adjustable air and fuel intake valves comprising, control means for developing a first electrical signal representative of the power requirements of the engine, means for deriving a second electrical signal representative of the absolute air flow to the engine, a first differential means for comparing said signals, means responsive to said differential means for adjusting the air intake valve of the engine, means for deriving a third electrical signal representative of the fuel flow to the engine, a second differential means for comparing said second and third signals, and means responsive to said second differential means for adjusting the fuel intake valve of the engine.

5. A system for controlling the input to an internal combustion engine in accordance with varying power requirements while maintaining an optimum fuel-air ratio, said engine including an independently adjustable throttle and fuel intake valve, comprising, means for adjusting said throttle in accordance with varying power requirements of the engine, means for determining the absolute air flow to the engine, means for developing a first electrical signal representative of the air flow to the engine, a voltage modulator having an output circuit including an adjustable element for developing a second electrical signal, means responsive jointly to said signals for adjusting said element to equalize said signals, a fuel requirements element connected to be set by said last-named means, and means for adjusting the fuel intake valve of the engine jointly in accordance with the fuel flow to the engine and the setting of said element.

6. A system for controlling the fuel-air ratio of the input to an internal combustion engine under variable operating conditions comprising, means for developing a first effect varying in accordance with the air-mass flow to the engine, means for developing a second effect varying in accordance with the fuel-mass flow to the engine, substantially unidirectionally acting means for comparing said effects, and means controlled by said last-named means for modifying the fuel-air ratio of the input to the engine.

7. A system for controlling the fuel-air ratio of the input to an internal combustion engine under variable operating conditions comprising, means for developing a first electrical signal varying in accordance with the air-mass flow to the engine, means for developing a second electrical signal varying in accordance with the fuel-mass flow to the engine, a substantially unidirectionally acting relay means for comparing said signals, and means controlled by said relay means for modifying the fuel-air ratio of the input to the engine.

8. A system for controlling the fuel-air ratio of the input to an internal combustion engine under variable operating conditions comprising, means for developing a first effect varying in accordance with the power requirements of the engine, means for developing a second effect substantially non-reactive on said first-named means and varying in accordance with the air-mass flow to the engine, means responsive jointly to said first and second effects for controlling the air mass flow to the engine, means for developing a third effect substantially non-reactive on said second-named means and varying in accordance with the fuel-mass flow to the engine, and means responsive jointly to said second and third effects for modifying the fuel-air ratio of the input to the engine.

9. A system for controlling the input to an internal combustion engine in accordance with varying power requirements, said engine including an adjustable throttle, comprising, control means mechanically independent of the throttle for setting the power requirements of the engine, means for determining the absolute air flow to the engine, and means for adjusting the throttle of the engine jointly in accordance with the setting of said control means and the air flow to the engine.

10. A system for controlling the input to an internal combustion engine in accordance with varying power requirements, said engine including an adjustable throttle, comprising, control means mechanically independent of the throttle for setting the power requirements of the engine, means for determining the absolute air flow to the engine, and means responsive jointly to the setting of said control means and the air-flow determining means for adjusting the throttle of the engine.

11. A system for controlling the input to an internal combustion engine in accordance with varying power requirements, said engine including an adjustable throttle, comprising, control means mechanically independent of the throttle for setting the power requirements of the engine, means for determining the absolute air flow to the engine in weight per unit time, and means for adjusting the throttle of the engine jointly in accordance with the setting of said control means and the air flow to the engine.

12. A system for controlling the input to an internal combustion engine in accordance with varying power requirements, said engine including an adjustable throttle, comprising, control means mechanically independent of the throttle for setting the power requirements of the engine, means for deriving an effect representative of the absolute air flow to the engine, differential means for comparing said effect with the setting of said control means, and means responsive to said differential means for adjusting the throttle of the engine.

13. A system for controlling the input to an internal combustion engine in accordance with varying power requirements, said engine including an adjustable throttle, comprising, control means mechanically independent of the throttle for developing a first effect representative of the power requirements of the engine, means for deriving a second effect of a type similar to said first effect and representative of the absolute air flow to the engine, and means responsive to the difference of said effects for adjusting the throttle to the engine.

14. A system for controlling the input to an internal combustion engine in accordance with varying power requirements, said engine including an adjustable throttle, comprising, control means mechanically independent of the throttle for developing a first electrical signal representative of the power requirements of the engine, means for deriving a second electrical signal representative of the absolute air flow to the engine, and means responsive to the difference of said signals for adjusting the throttle to the engine.

15. A system for controlling the input to an internal combustion engine in accordance with varying power requirements, said engine including an air intake conduit having an adjustable throttle therein comprising, control means for setting the power requirements of the engine, means for developing a first electrical effect varying with the velocity of the air in said conduit, means for developing a second electrical effect varying with the temperature of the air in said conduit, means for developing a third electrical effect varying with the pressure of the air in said conduit, a voltage modulator including an adjustable element, an electrical bridge circuit including said modulator and including provisions for introducing said electrical effects therein, means responsive to an unbalance of said bridge circuit for adjusting said element to rebalance said bridge, and means operable independently of said control means for adjusting the throttle of the engine jointly in accordance with the setting of said control means and the setting of said adjustable element.

16. A system for controlling the input to an internal combustion engine in accordance with varying power requirements, said engine including an air intake conduit having an adjustable throttle therein comprising, control means for setting the power requirements of the engine, a constriction in said conduit, means for developing a first electrical signal varying with the square-root of the differential pressure across said constriction, means for modifying said first effect in accordance with the temperature of the air in said conduit, a voltage modulator including an adjustable element for developing a second electrical signal, means for modifying the excitation of said voltage modulator in accordance with the pressure of the air in said conduit, means responsive to the difference between said first and second signals for adjusting said element to balance said signals, and means operable independently of said control means for adjusting the throttle of the engine jointly in accordance with the setting of said control means and the setting of said adjustable element.

17. A system for controlling the input to an internal combustion engine in accordance with varying power requirements, said engine including an adjustable throttle, comprising, a control device for setting the power requirements of the engine, an alternating-current supply circuit, means controlled by said device for deriving from said circuit a first electrical signal modulated in accordance with the setting of said device, measuring means for determining the absolute air flow to the engine, means responsive to said measuring means for deriving from said circuit a second electrical signal modulated in accordance with said air flow, a polyphase electromotive device including a phase winding excited from said circuit and a phase winding excited by the difference of said signals, phase-shifting means included in the exciting circuit of one of said windings, said electromotive device being connected to adjust the throttle of the engine.

18. A system for controlling the fuel input to an internal combustion engine in accordance with varying power requirements, said engine including a fuel system having a fuel intake valve, comprising, means independent of the fuel system for setting the desired fuel flow to the engine, means for measuring the actual fuel flow to the engine, and means for adjusting the fuel intake valve of the engine solely in accordance with the difference between the desired and actual fuel flows.

19. A system for controlling the fuel input to an internal combustion engine in response to varying power requirements, said engine including a fuel system having a fuel intake valve, comprising, means independent of the fuel system for setting the desired fuel flow to the engine, means for measuring the actual fuel flow to the engine, and means responsive solely to the difference between the desired and actual fuel flows for adjusting the fuel intake valve of the engine.

20. A system for controlling the fuel input to an internal combustion engine in response to varying power requirements, said engine including a fuel system having a fuel intake valve, comprising, means independent of said fuel system for setting the desired fuel flow to the engine, means for measuring the actual fuel flow to the engine, and a normally-balanced power follow-up system including a primary element actuated by said fuel-setting means, a secondary element actuated by said measuring means, and means responsive to the difference in positions of said primary and secondary elements for adjusting the fuel intake valve to the engine, thereby rebalancing said follow-up system.

21. A system for controlling the fuel input to an internal combustion engine in response to varying power requirements, said engine including a fuel system having a fuel intake valve, comprising, means independent of said fuel system for deriving an effect representative of the desired fuel flow to the engine, means for modifying said effect in accordance with the temperature of the engine, means for deriving an effect representative of the actual fuel flow to the engine, and means for adjusting the fuel intake valve of the engine in accordance with the difference between said first-named effect and said last-named effect.

22. A system for controlling the fuel input to an internal combustion engine in response to varying power requirements, said engine including a fuel system having a fuel intake valve, comprising, means independent of said fuel system for deriving an effect representative of the desired fuel flow to the engine, means for varying said effect inversely with the temperature of the engine to limit the heating thereof, means for deriving an effect representative of the actual fuel flow to the engine, and means for adjusting the fuel intake valve of the engine in accordance with the difference between said first-named effect and said last-named effect.

23. A system for controlling the fuel input to an internal combustion engine in response to varying power requirements, said engine including a fuel system having a fuel intake valve, comprising, means independent of the fuel system and including a voltage divider for deriving an electrical signal representative of the desired fuel flow to the engine, and a circuit including a temperature-responsive resistor subject to the engine temperature connected across a portion of said voltage divider for modifying said signal to limit the heating of the engine, means for deriving an effect representative of the actual fuel flow to the engine, and means for comparing said modified signal and said derived effect and for adjusting the fuel intake valve of the engine jointly in accordance therewith.

24. The method of controlling the fuel input to an internal combustion engine in accordance with varying power requirements, said engine including a fuel system having a fuel intake valve, which comprises setting the desired fuel flow to the engine independently of the fuel system, measuring the actual fuel flow to the engine, and adjusting the fuel intake valve of the engine solely in accordance with the difference between the desired and actual fuel flows.

25. The method of controlling the air and fuel input to an internal combustion engine in accordance with varying power requirements while maintaining an optimum fuel-air ratio, said engine including independently adjustable air and fuel intake valves and a single control means, which comprises, setting the control means to the desired engine power, measuring the absolute air flow to the engine, adjusting the air intake valve of the engine independently of said control means and jointly in accordance with the setting of said control means and the air flow to the engine, measuring the fuel flow to the engine, deriving from the measured air flow an effect representative of the fuel requirements of the engine, and adjusting the fuel intake valve of the engine jointly in accordance with the fuel flow to the engine and said effect.

26. The method of controlling the air and fuel input to an internal-combustion engine in accordance with varying power requirements while maintaining an optimum fuel-air ratio, said engine including independently adjustable air and fuel intake valves, which comprises, developing a first electrical signal representative of the power requirements of the engine, deriving a second electrical signal representative of the air flow to the engine, comparing said signals, adjusting the air intake valve of the engine in accordance with the difference of said signals, deriving a third electrical signal representative of the fuel flow to the engine, comparing said second and third signals, and adjusting the fuel intake valve of the engine in accordance with the difference of said second and third signals.

DAVID W. MOORE, Jr.

REFERENCES CITED

The following references are of record in the file of this patent:

UNITED STATES PATENTS

| Number | Name | Date |
|---|---|---|
| 1,186,976 | Dugrey | June 13, 1916 |
| 1,437,626 | Wilson | Dec. 5, 1922 |

(Other references on following page)

UNITED STATES PATENTS

| Number | Name | Date |
|---|---|---|
| 1,449,437 | Obermaier | Mar. 27, 1923 |
| 1,573,850 | Naiman | Feb. 23, 1926 |
| 1,849,335 | Schmidt | Mar. 15, 1932 |
| 2,159,173 | Mennesson | May 23, 1939 |
| 2,217,364 | Halford et al. | Oct. 8, 1940 |
| 2,269,294 | Udale | Jan. 6, 1942 |
| 2,281,411 | Campbell | Apr. 28, 1942 |
| 2,303,998 | Holley | Dec. 1, 1942 |
| 2,324,599 | Schorn | July 20, 1943 |
| 2,330,650 | Weiche | Sept. 28, 1943 |
| 2,336,844 | Buck | Dec. 14, 1943 |
| 2,341,257 | Wunsch | Feb. 8, 1944 |
| 2,361,228 | Mock | Oct. 24, 1944 |
| 2,372,356 | Chandler | Mar. 27, 1945 |
| 2,372,766 | Colvin et al. | Apr. 3, 1945 |
| 2,378,036 | Reggio | June 12, 1945 |
| 2,382,707 | Gosslau et al. | Aug. 14, 1945 |
| 2,402,885 | Gilfillan et al. | June 25, 1946 |
| 2,407,317 | Mennesson | Sept. 10, 1946 |

FOREIGN PATENTS

| Number | Country | Date |
|---|---|---|
| 442,497 | Great Britain | of 1934 |
| 517,321 | Great Britain | Jan. 26, 1940 |